United States Patent
Park et al.

(10) Patent No.: US 9,448,438 B2
(45) Date of Patent: Sep. 20, 2016

(54) LIQUID CRYSTAL DISPLAY PANEL COMPRISING ALIGNMENT MOLECULES HAVING A CORE PORTION, A POLARITY PORTION, AND A TAIL PORTION

(71) Applicant: Samsung Display Co., Ltd., Yongin (KR)

(72) Inventors: Heungshik Park, Seoul (KR); Jihong Bae, Yongin-si (KR); Sujin Kim, Seoul (KR); Kichul Shin, Seongnam-si (KR); Jooyoung Yoon, Suwon-si (KR); Hyeokjin Lee, Seongnam-si (KR); Suk Choi, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 121 days.

(21) Appl. No.: 14/204,431

(22) Filed: Mar. 11, 2014

(65) Prior Publication Data

US 2015/0070640 A1    Mar. 12, 2015

(30) Foreign Application Priority Data

Sep. 11, 2013    (KR) .................. 10-2013-0109203

(51) Int. Cl.
G02F 1/1337    (2006.01)

(52) U.S. Cl.
CPC ......... *G02F 1/1337* (2013.01); *G02F 1/13378* (2013.01); *G02F 2001/133742* (2013.01)

(58) Field of Classification Search
CPC ........... G02F 1/133734; G02F 1/1337; G02F 2001/133742
See application file for complete search history.

(56) References Cited

U.S. PATENT DOCUMENTS 6,995,825 B2    2/2006    Graham et al.
7,550,094 B2    6/2009    Jeng et al.
(Continued)

FOREIGN PATENT DOCUMENTS

EP    1340118    2/2011
JP    2003-195032    7/2003
(Continued)

OTHER PUBLICATIONS

Steven H. Untracht and G. Graham Shipley, "Molecular Interactions between Lecithin and Sphingomyelin. Temperature- and composition-dependent phase separation," The Journal of Biological Chemistry, Jul. 10, 1977, pp. 4449-4457, vol. 252, No. 13, The American Society for Biochemistry and Molecular Biology.

(Continued)

*Primary Examiner* — Paul Lee
(74) *Attorney, Agent, or Firm* — H.C. Park & Associates, PLC

(57) ABSTRACT

A liquid crystal display panel including a first display substrate, a second display substrate coupled to and spaced apart from the first display substrate, and a liquid crystal layer disposed between the first and second display substrates. The first and second display substrates include inorganic layers containing an inorganic silicon-based material. The liquid crystal layer includes alignment molecules vertically aligned with respect to the inorganic layers, and liquid crystal molecules vertically aligned between the inorganic layers. A manufacturing method of the liquid crystal display panel includes surface-treating the inorganic layers to vertically align the liquid crystal molecules.

9 Claims, 17 Drawing Sheets

(56) References Cited

U.S. PATENT DOCUMENTS

| | | | |
|---|---|---|---|
| 7,588,806 B2 | 9/2009 | Hirai | |
| 7,648,646 B2 | 1/2010 | Harding et al. | |
| 7,767,108 B2 | 8/2010 | Kataoka | |
| 8,029,695 B2 | 10/2011 | Lee et al. | |
| 2001/0005258 A1* | 6/2001 | Kobayashi | G02F 1/133345 349/158 |
| 2005/0099578 A1* | 5/2005 | Kim | G02F 1/134363 349/155 |
| 2006/0127603 A1 | 6/2006 | Kim et al. | |
| 2007/0154655 A1* | 7/2007 | Chae | B82Y 30/00 428/1.2 |
| 2011/0234956 A1* | 9/2011 | Umezawa | H01L 27/12 349/138 |
| 2012/0154727 A1* | 6/2012 | Chang | G02F 1/133707 349/129 |
| 2012/0257123 A1* | 10/2012 | Lee | B60R 1/088 349/1 |

FOREIGN PATENT DOCUMENTS

| | | |
|---|---|---|
| JP | 2006-030555 | 2/2006 |
| JP | 2006-342332 | 12/2006 |
| KR | 10-1997-0011979 | 3/1997 |
| KR | 10-2011-0099939 | 9/2011 |
| KR | 10-2012-0022389 | 3/2012 |
| WO | 2012/038026 | 3/2012 |

OTHER PUBLICATIONS

Magda A. El-Nokaly, et al., "The Structure of Lamellar Lyotropic Liquid Crystals from Lecithin and Alkanediols," Journal of Colloid and Interface Science, Nov. 1981, pp. 228-234, vol. 84, Academic Press, Inc.

J. Ulmius, et al., "Molecular Organization in the Liquid-Crystalline Phases of Lecithin-Sodium Cholate-Water Systems Studied by Nuclear Magnetic Resonance," Biochemistry, Mar. 1982, pp. 1553-1560, vol. 21, American Chemical Society.

Jacques Cognard, "The Interfacial Layer of Inorganic Solid Surfaces and Liquid Crystals-Implication on the Anchoring Energy," Molecular Crystals and Liquid Crystals, 1981, pp. 331-342, vol. 64, Issue 9-10, Gordon and Breach, Science Publishers, Inc.

V. G. Nazarenko, et al., "Surface Alignment and Anchoring Transitions in Nematic Lyotropic Chromonic Liquid Crystal," Physical Review Letters, Jul. 2, 2010, vol. 105, The American Physical Society.

A. R. Campanelli and L. Scaramuzza, "Hexadecyltrimethylammonium Bromide," Acta Crystallographic Section C, Oct. 1986, pp. 1380-1383, vol. 42, International Union of Crystallography.

Shug-June Hwang, et al., "Characteristics of nanoparticle-doped homeotropic liquid crystal devices," Journal of Physics D: Applied Physics, Dec. 18, 2008, pp. 1-6, vol. 42, No. 2, IOP Publishing, Ltd.

Shie-Chang, Jeng, et al., "Nanoparticles-induced vertical alignment in liquid crystal cell," Applied Physics Letters, 2007, pp. 061112-1-061112-3, vol. 91, American Institute of Physics.

Koso Aoki, et al., "Photo-induced regulation of nematic liquid crystal alignment by mixed monolayers of an azobenzene with long chain alkyl residues," Thin Solid Films, Oct. 30, 1992, pp. 226-230, vol. 219, Issues 1-2, Elsevier Sequoia.

Da-Ren Chiou, et al. "Adjustable pretilt angle of nematic 4-n-pentyl-4 cyanobiphenyl on self-assembled monolayers formed from organanosilanes on square-wave grating silica surfaces," Aplied Physics Letters, Mar. 31, 2006, vol. 88, Issue 13. American Institute of Physics.

Yuliang Wang and Marya Liberman, "Growth of Ultrasmooth Octadecyltrichlorosilane Self-Assembled Monolayers on $SiO_2$," Langmuir, Jan. 17, 2003, pp. 1159-1167, vol. 19, No. 4, American Chemical Society.

Junfei Ou, et al., "Self-Assembly of Octadecyltrichlorosilane on Graphene Oxide and the Tribological Performances of the Resultant Film," The Journal of Physical Chemistry C, May 4, 2011, pp. 10080-10086, vol. 115, No. 20, American Chemical Society.

Da-Ren Chiou and Li-Jen Chen, "Pretilt Angle of a Nematic Liquid Crystal on Microgrooved Silica Surfaces Continuously Manipulated by the Surface Hydrophobicity," The Journal of Physical Chemistry C, 2009, pp. 9797-9803, vol. 113, No. 22, American Chemical Society.

* cited by examiner

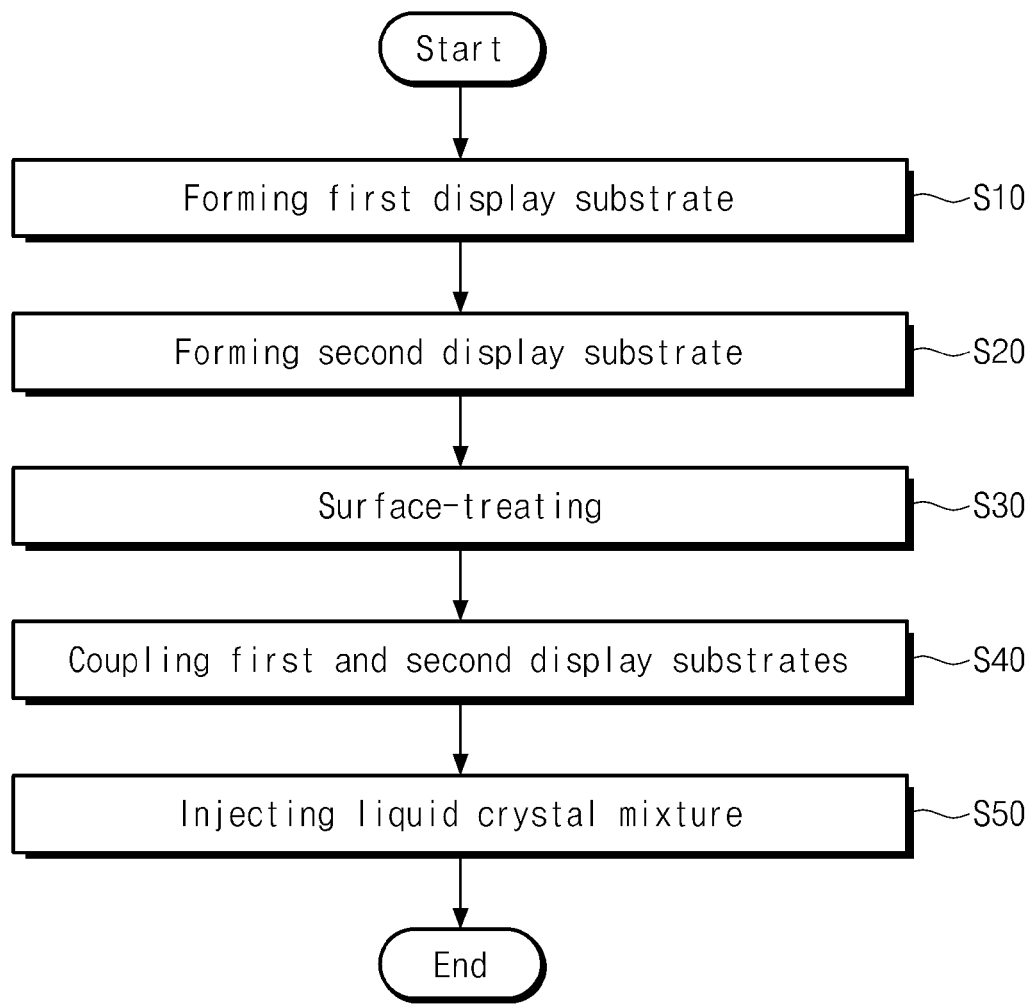

(Unbaked)

(Baked)

LIQUID CRYSTAL DISPLAY PANEL COMPRISING ALIGNMENT MOLECULES HAVING A CORE PORTION, A POLARITY PORTION, AND A TAIL PORTION

CROSS-REFERENCE TO RELATED APPLICATION

This U.S. non-provisional patent application claims priority from and the benefit of Korean Patent Application No. 10-2013-0109203, filed on Sep. 11, 2013, which is hereby incorporated by reference for all purposes as if fully set forth herein.

BACKGROUND

1. Field

Exemplary embodiments of the present invention relate to a liquid crystal display panel and a method of manufacturing the same. More particularly, exemplary embodiments of the present invention relate to a vertical alignment mode liquid crystal display panel and a method of manufacturing the vertical alignment mode liquid crystal display panel.

2. Discussion of the Background

In general, a liquid crystal display includes a liquid crystal display panel that displays an image using light provided by a backlight unit. The liquid crystal display further includes an optical film, such as a polarizing plate.

The liquid crystal display panel includes two base substrates spaced apart from each other, and a liquid crystal layer disposed between the two base substrates. When an electric field is formed in the liquid crystal layer, an arrangement of liquid crystal molecules of the liquid crystal layer varies. The amount of transmittance of light passing through the liquid crystal layer is determined by the variation in arrangement of the liquid crystal molecules.

The liquid crystal display panel may be classified as a horizontal alignment mode, a vertical alignment mode, or a twisted-nematic mode.

The above information disclosed in this Background section is only for enhancement of understanding of the background of the invention and, therefore, it may contain information that does not constitute prior art.

SUMMARY

Exemplary embodiments of the present invention provide a vertical alignment mode liquid crystal display panel from which an organic alignment layer is omitted.

Exemplary embodiments of the present invention also provide a method of manufacturing the vertical alignment mode liquid crystal display panel.

Additional aspects will be set forth in part in the description which follows and, in part will be apparent from the description, or may be learned by practice of the invention.

An exemplary embodiment of the present invention discloses a liquid crystal display panel including a first display substrate, a second display substrate coupled to and spaced apart from the first display substrate, and a liquid crystal layer disposed between the first and second display substrates.

The first display substrate includes a first base substrate, pixel electrodes disposed on the first base substrate, and a first inorganic layer covering the pixel electrodes and including an inorganic silicon-based material.

The second display substrate includes a second base substrate, a common electrode disposed on the second base substrate, and a second inorganic layer disposed on the common electrode and including the inorganic silicon-based material.

The liquid crystal layer includes alignment molecules vertically aligned with respect to the first inorganic layer and the second inorganic layer, and liquid crystal molecules vertically aligned between the first inorganic layer and the second inorganic layer.

An exemplary embodiment of the present invention also discloses a method of manufacturing a liquid crystal display panel, including forming a first display substrate that includes a first base substrate, pixel electrodes disposed on the first base substrate, and a first inorganic layer covering the pixel electrodes and including an inorganic silicon-based material, forming a second display substrate that includes a second base substrate, a common electrode disposed on the second base substrate, and a second inorganic layer disposed on the common electrode and including the inorganic silicon-based material, surface-treating the first and second inorganic layers, coupling the first display substrate to the second display substrate after interposing a sealant between the first and second display substrate, and injecting a liquid crystal mixture that includes alignment molecules and liquid crystal molecules between the first and second display substrates.

An exemplary embodiment of the present invention also discloses a liquid crystal display panel including a first display substrate, a second display substrate coupled to and spaced apart from the first display substrate, and a liquid crystal layer disposed between the first and second display substrates.

The first display substrate includes a first base substrate, an organic layer disposed on the first base substrate, a first inorganic layer disposed on the organic layer and including an inorganic silicon-based material, and pixel electrodes disposed on the organic layer.

The second display substrate includes a second base substrate and a common electrode disposed on the second base substrate.

The liquid crystal layer includes alignment molecules vertically aligned with respect to the first inorganic layer and the common electrode, and liquid crystal molecules vertically aligned between the first inorganic layer and the common electrode.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 12 is a flowchart showing a method of manufacturing a liquid crystal display panel according to an exemplary embodiment of the present invention.

DETAILED DESCRIPTION OF THE ILLUSTRATED EMBODIMENTS

Figure 1:
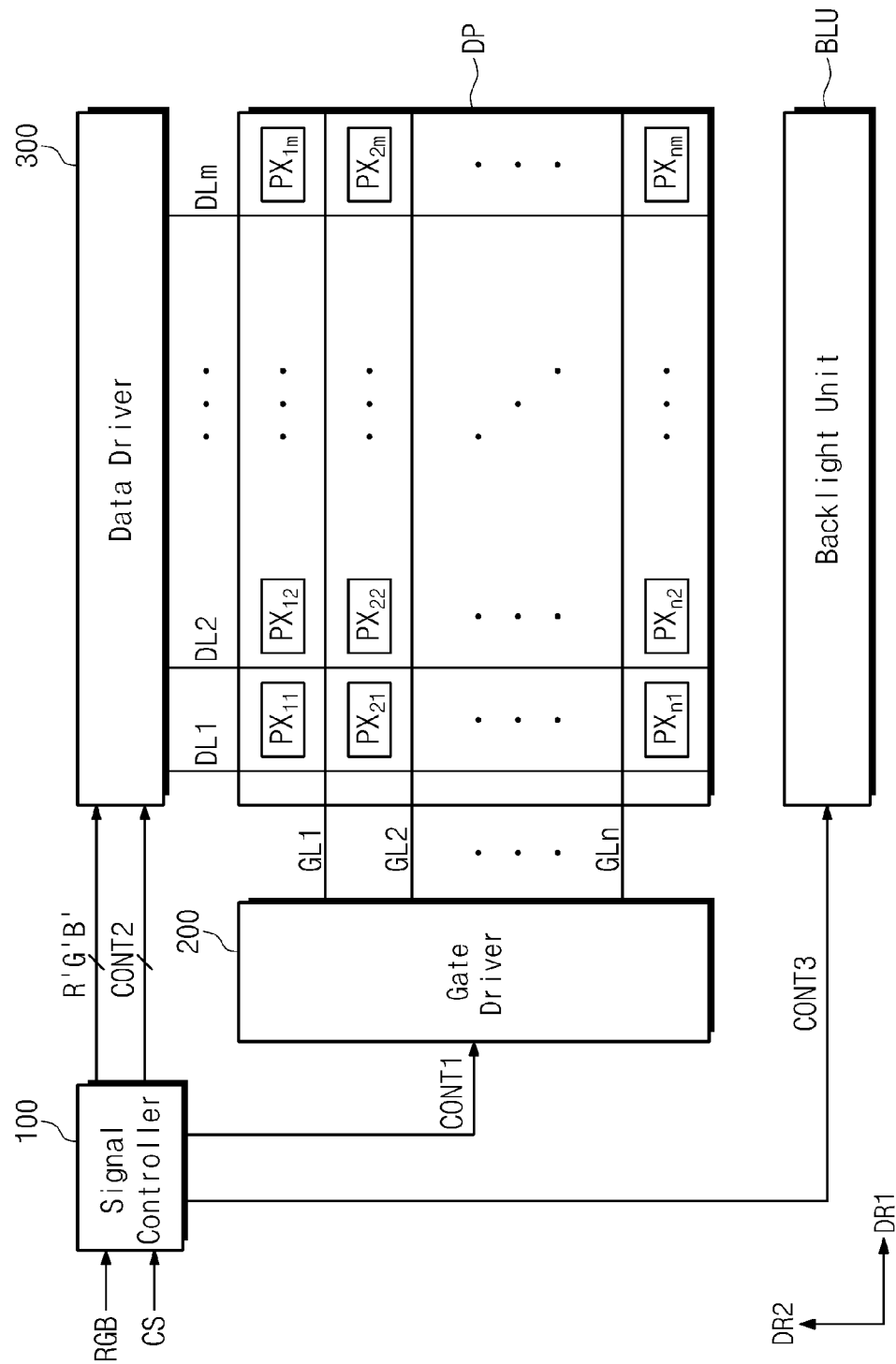
FIG. 1 is a block diagram showing a liquid crystal display according to an exemplary embodiment of the present invention.

The present invention will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of elements may be exaggerated for clarity. Like reference numerals in the drawings denote like elements.

It will be understood that when an element or layer is referred to as being "on", "connected to", or "coupled to" another element or layer, it can be directly on, directly connected to, or directly coupled to the other element or layer, or intervening elements or layers may be present. In contrast, when an element is referred to as being "directly on," "directly connected to", or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ). As used herein, the term "and/or" includes any and all combinations of one or more of the associated listed items.

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Referring to FIG. 1, a liquid crystal display includes a liquid crystal display panel DP, a signal controller 100, a gate driver 200, a data driver 300, and a backlight unit BLU.

The liquid crystal display panel DP includes signal lines and pixels PX11 to PXnm connected to the signal lines. The signal lines are configured to include gate lines GL1 to GLn and data lines DL1 to DLm. The gate lines GL1 to GLn extend in a first direction DR1 and are arranged in a second direction DR2. The data lines DL1 to DLm are insulated from the gate lines GL1 to GLn while crossing the gate lines GL1 to GLn.

The pixels PX11 to PXnm are arranged in a matrix form. Each of the pixels PX11 to PXnm is connected to a corresponding gate line of the gate lines GL1 to GLn and a corresponding data line of the data lines DL1 to DLm.

The signal controller 100 receives input image signals RGB and converts the input image signals RGB to image data R'G'B' suitable for an operation of the liquid crystal display panel DP. In addition, the signal controller 100 receives various control signals CS, such as a vertical synchronization signal, a horizontal synchronization signal, a main clock signal, a data enable signal, etc, and outputs first and second control signals CONT1 and CONT2. Further, the signal controller 100 outputs a third control signal CONT3 to control the backlight unit BLU. The third control signal CONT3 may include a dimming signal.

The gate driver 200 applies gate signals to the gate lines GL1 to GLn in response to the first control signal CONT1. The first control signal CONT1 includes a vertical start signal to start an operation of the gate driver 200, a gate clock signal to determine an output timing of the gate voltage, and an output enable signal to determine an on-pulse width of the gate voltage.

The data driver 300 receives the second control signal CONT2 and the image data R'G'B'. The data driver 300 converts the image data R'G'B' to data voltages and applies the data voltages to the data lines DL1 to DLm. The second control signal CONT2 includes a horizontal start signal to start an operation of the data driver 300, an inverting signal to invert a polarity of the data voltages, and an output indicating signal to determine an output timing of the data voltages from the data driver 300.

The backlight unit BLU provides light to the liquid crystal display panel DP in response to the third control signal CONT3. The backlight unit BLU includes a light emitting device to emit light. The backlight unit BLU may be a direct-illumination type or an edge-illumination type.

Figure 2:
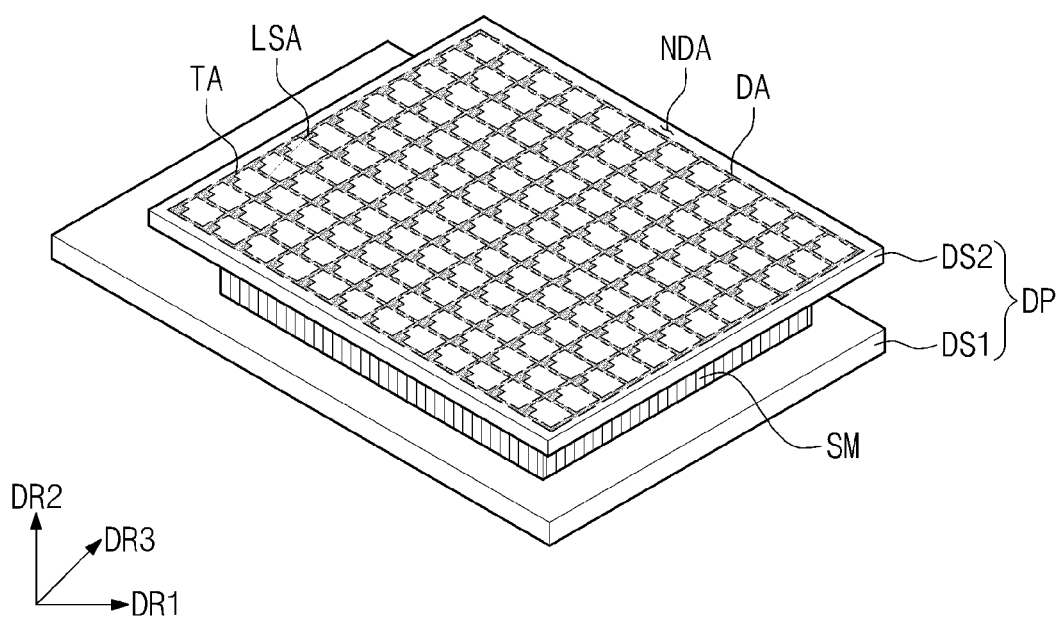
FIG. 2 is a perspective view showing a liquid crystal display panel according to an exemplary embodiment of the present invention.

As shown in FIG. 2, the liquid crystal display panel DP includes a display area DA, in which an image is displayed, and a non-display area NDA disposed adjacent to the display area DA. The display area DA includes a light blocking area LSA and transmitting areas TA, distinct from the light blocking area LSA, and arranged in a black matrix. The transmitting areas TA transmit the light generated by the backlight unit BLU, and the light blocking area LSA blocks the light generated by the backlight unit BLU.

The liquid crystal display panel DP includes a first display substrate DS1 and a second display substrate DS2. The first display substrate DS1 and the second display substrate DS2 are spaced apart from each other in a thickness direction DR3 (hereinafter, referred to as a "third direction"). The first display substrate DS1 and the second display substrate DS2 are coupled to each other by a sealant SM in the non-display area NDA. A cell gap between the first and second display substrates DS1 and DS2 is determined depending on a height of the sealant SM. A liquid crystal layer (not shown) is disposed between the first and second display substrates DS1 and DS2.

The gate lines GL1 to GLn, the data lines DL1 to DLm, and the pixels PX11 to PXnm, which are shown in FIG. 1, are disposed on the first display substrate DS1 or the second display substrate DS2. The gate lines GL1 to GLn and the data lines DL1 to DLm are overlapped with the light blocking area LSA. The pixels PX11 to PXnm are overlapped with the transmitting areas TA.

Figure 3:
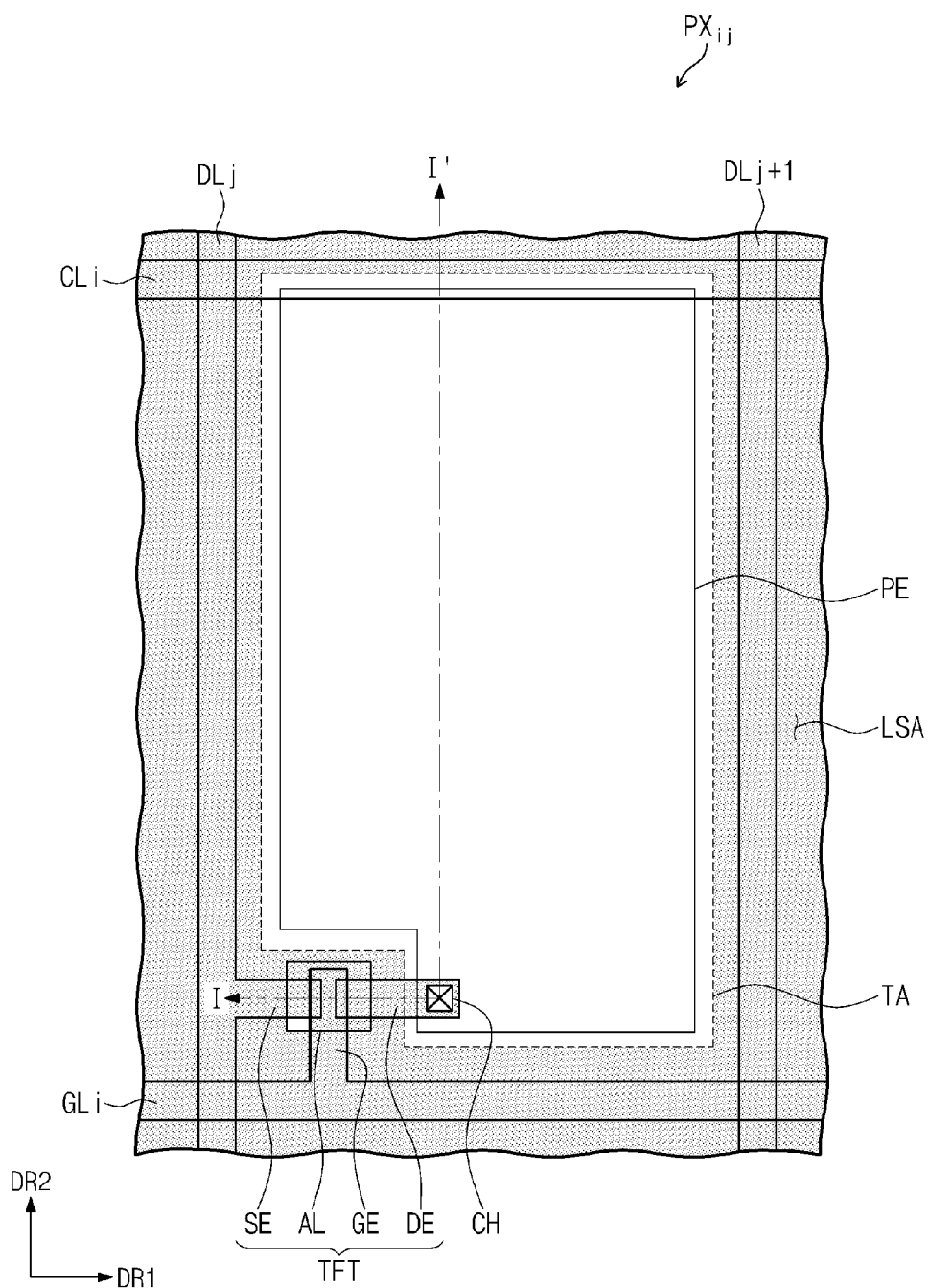
FIG. 3 is a plan view showing a pixel according to an exemplary embodiment of the present invention.
Figure 4:
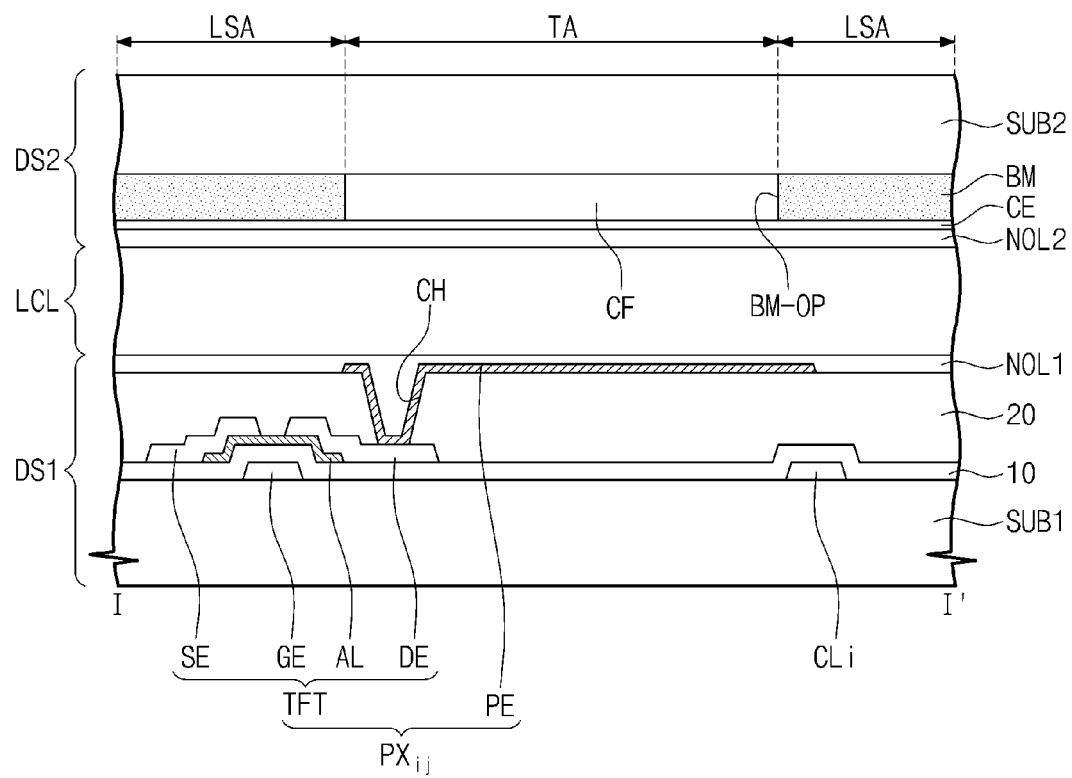
FIG. 4 is a cross-sectional view taken along a line I-I' of the pixel shown in FIG. 3.

Referring to FIGS. 3 and 4, the first display substrate DS1 includes a first base substrate SUB1, a gate line GLi, data lines DLj and DLj+1, insulating layers 10 and 20, a pixel PXij, and a first inorganic layer NOL1. The first display substrate DS1 may further include a common line CLi, to which a reference voltage is applied. The reference voltage may be the same as the voltage applied to a common electrode CE that will be described later.

FIGS. 3 and 4 show the pixel PXij connected to an i-th gate line GLi and a j-th data line DLj among the pixels PX11 to PXnm as a representative example. The pixel PXij includes a thin film transistor TFT and a pixel electrode PE connected to the thin film transistor TFT. The thin film transistor TFT overlaps with the light blocking area LSA.

The thin film transistor TFT is connected to the i-th gate line GLi and the j-th data line DLj. The thin film transistor TFT applies the data voltage applied to the j-th data line DLj to the pixel electrode PE in response to the gate signal applied to the i-th gate line GLi. The pixel electrode PE receives a pixel voltage corresponding to the data voltage. The pixels PX11 to PXnm have the same configuration and function as those of the pixel PXij. In addition, the configuration of the pixel PXij may be changed.

The first base substrate SUB1 may be a transparent substrate, e.g., a glass substrate, a plastic substrate, a silicon substrate, etc. A gate electrode GE of the thin film transistor TFT and the i-th gate line GLi are disposed on the first base substrate SUB1. The gate electrode GE is connected to the i-th gate line GLi.

The gate electrode GE is formed of the same material as the i-th gate line GLi, and has the same layer structure as the i-th gate line GLi. The gate electrode GE and the i-th gate line GLi include copper (Cu), aluminum (Al), an alloy thereof, or an alloy of each of copper and aluminum. The gate electrode GE and the i-th gate line GLi may have a multi-layer structure of aluminum and another metal layer.

The common line CLi is disposed on the same layer as the i-th gate line GLi. The common line CLi includes the same material as that of the i-th gate line GLi, and has the same layer structure as that of the i-th gate line GLi.

A gate insulating layer 10 is disposed on the first base substrate SUB1 to cover the gate electrode GE, the i-th gate line GLi, and the common line CLi. A semiconductor layer AL is disposed on the gate insulating layer 10 to overlap with the gate electrode GE, and an ohmic contact layer (not shown) is disposed on the gate insulating layer 10.

The data lines DLj and DLj+1 are disposed on the gate insulating layer 10. The data lines DLj and DLj+1 include copper (Cu), aluminum (Al), an alloy thereof, or an alloy of each of copper and aluminum. The data lines DLj and DLj+1 may have a multi-layer structure of aluminum and another metal layer, e.g., chromium or molybdenum.

Among the data lines DLj and DLj+1, a source electrode SE of the thin film transistor TFT is connected to the j-th data line DLj. The source electrode SE includes the same material as and has the same layer structure the data lines DLj and DLj+1.

A drain electrode DE is disposed on the gate insulating layer 10 to be spaced apart from the source electrode SE. The source electrode SE and the drain electrode DE are overlapped with the semiconductor layer AL.

A planarization layer 20 is disposed on the gate insulating layer 10 to cover the source electrode SE, the drain electrode DE, and the data lines DLj and DLj+1. The planarization layer 20 is configured to include one organic layer disposed on the first base substrate SUB1.

The pixel electrode PE is disposed on the planarization layer 20. The pixel electrode PE is connected to the drain electrode DE through a contact hole CH formed through the planarization layer 20. The pixel electrode PE is not limited to the shape shown in FIG. 3, and may also have other shapes and features, including a plurality of slits.

The pixel electrode PE includes a transparent conductive material. The pixel electrode PE may include a transparent conductive inorganic material, such as indium tin oxide (ITO) or indium zinc oxide (IZO).

The first inorganic layer NOL1 is disposed on the planarization layer 20. The first inorganic layer NOL1 covers the pixel electrode PE. The first inorganic layer NOL1 protects the pixel electrode PE from moisture. In addition, the first inorganic layer NOL1 influences the alignment of the liquid crystal layer LCL.

The first inorganic layer NOL1 includes an inorganic silicon-based material. That is, the first inorganic layer NOL1 includes a silicon compound. For instance, the first inorganic layer NOL1 may include at least one of silicon nitride or silicon oxide. The first inorganic layer NOL1 has a thickness of about 1 nm to about 1000 nm. To prevent an electric field formed in the pixel PXij from being reduced below a reference value, the first inorganic layer NOL1 may have the thickness equal to or less than about 1000 nm.

The second display substrate DS2 includes a second base substrate SUB2, a black matrix BM, a color filter CF, a common electrode CE, and a second inorganic layer NOL2. The second display substrate DS2 may be a transparent substrate, e.g., a glass substrate, a plastic substrate, a silicon substrate, etc.

An area in which the black matrix BM is disposed is referred to as the "light blocking area (LSA)". The black matrix LSA includes a plurality of openings BM-OP. FIG. 4 shows one opening BM-OP corresponding to one pixel PXij. The opening BM-OP defines the transmitting area TA.

The color filter CF is overlapped with the transmitting area TA. The second display substrate DS2 may include color filters having different colors. For instance, some of the color filters have a red color, others of the color filters have a green color, and still others of the color filters have a blue color.

The common electrode CE is disposed on the black matrix BM and the color filter CF. Although not shown in figures, the second display substrate DS2 may further include a planarization layer to cover the black matrix BM and the color filter CF. The common electrode CE may be disposed on the planarization layer.

The common electrode CE includes a transparent conductive material. The common electrode CE may include a transparent conductive inorganic material. For instance, the common electrode CE may include indium tin oxide (ITO) or indium zinc oxide (IZO).

The second inorganic layer NOL2 is disposed on the common electrode CE. The second inorganic layer NOL2 includes an inorganic silicon-based material as the first inorganic layer NOL1. The second inorganic layer NOL2 has a thickness of about 1 nm to about 1000 nm. The second inorganic layer NOL2 protects the pixel electrode PE from moisture. In addition, the second inorganic layer NOL2 exerts an influence on the alignment of the liquid crystal layer LCL. The second inorganic layer NOL2 may be omitted in accordance with the material used to form the common electrode CE.

According to another exemplary embodiment, at least one of the black matrix BM and the color filters CF may be disposed on the first base substrate SUB1. In addition, the common electrode CE may include a plurality of slits to form a plurality of domains.

The liquid crystal layer LCL includes liquid crystal molecules and alignment molecules that control the alignment of the liquid crystal molecules. The liquid crystal molecules are vertically aligned between the first inorganic layer NOL1 and the second inorganic layer NOL2.

Figure 5:
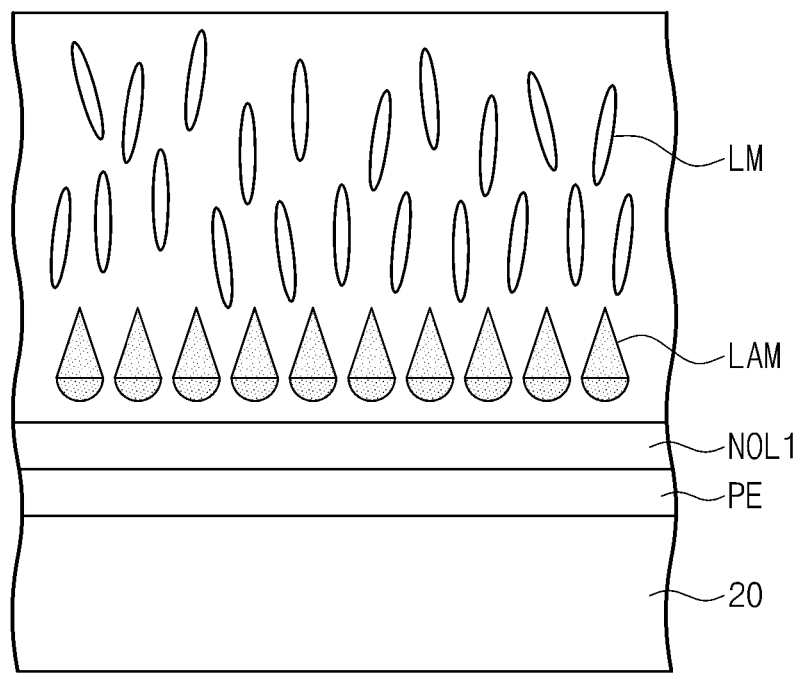
FIG. 5 is an enlarged view showing alignment molecules and liquid crystal molecules disposed on a first inorganic layer of a liquid crystal display according to an exemplary embodiment of the present invention.

FIG. 5 is an enlarged view showing alignment molecules and liquid crystal molecules disposed on a first inorganic layer of a liquid crystal display according to an exemplary embodiment of the present invention. Hereinafter, the liquid crystal layer LCL will be described in detail with reference to FIG. 5. FIG. 5 shows only the alignment of the liquid crystal molecules of the liquid crystal layer LCL with respect to the first inorganic layer NOL1, but the alignment of the liquid crystal molecules of the liquid crystal layer LCL with respect to the second inorganic layer NOL2 is the same.

The liquid crystal molecules LM and the alignment molecules LAM are injected between the first display substrate DS1 and the second display substrate DS2 in a liquid crystal mixture. The alignment molecules LAM may have a structure similar to that of the liquid crystal molecules LM. Thus, the alignment molecules LAM are easily mixed with the liquid crystal molecules LM. The alignment molecules LAM have a weight ratio of about 0.001 wt % to about 5.0 wt % with respect to the liquid crystal mixture.

The alignment molecules LAM are configured to include a core portion, a tail portion, and a polarity portion. The polarity portion is connected to an end of the core portion and the tail portion is connected to the other end of the core portion. The core portion may include one of biphenyl, benzene, and cyclohexane. The polarity portion may include a hydroxyl group (OH) or an amino group (NH2). The tail portion may include alkyl groups connected to each other one after another. The tail portion may include three to ten alkyl groups.

The following chemical molecular formulas 1 to 4 represent the alignment molecules LAM. The chemical molecular formulas 1 to 4 may be modified such that the polarity portion may include two or three hydroxyl groups (OH) or amino group (NH2).

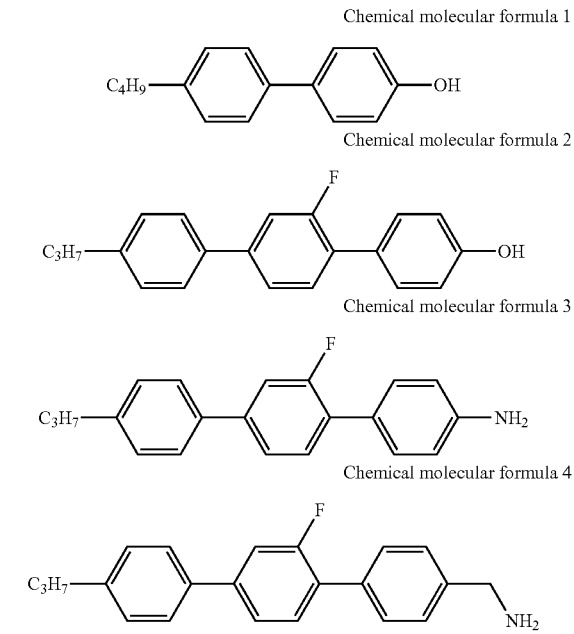

Chemical molecular formula 1

Chemical molecular formula 2

Chemical molecular formula 3

Chemical molecular formula 4

The first inorganic layer NOL1 covers the planarization layer 20 such that the planarization layer 20 including an organic material does not make contact with the alignment molecules LAM and liquid crystal molecules LM. The alignment molecules LAM physically react with the first inorganic layer NOL1. The polarity portion of the alignment molecules LAM having a hydrophilic property interacts with the first inorganic layer NOL1. As a result of the anisotropic hydrophilic interaction, the alignment molecules LAM are vertically aligned with the first inorganic layer NOL1. The hydroxyl group (OH), or the amino group (NH$_2$), of the polarity portion of the alignment molecules LAM is hydrogen-bonded with oxygen or hydrogen of the first inorganic layer NOL1. The alignment molecules LAM form one alignment molecule layer on the first inorganic layer NOL1. Although not shown in figures, the alignment molecules LAM may form another one alignment molecule layer on the second inorganic layer NOL2 (refer to FIG. 4).

The liquid crystal molecules LM are vertically aligned by the alignment molecules LAM. The liquid crystal molecules LM may be nematic liquid crystal molecules having constant negative dielectric anisotropy.

Figure 6A:
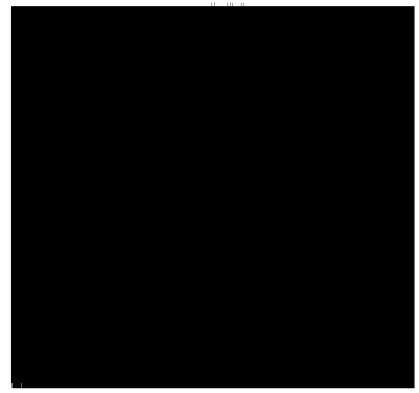
FIGS. 6(a), 6(B), and 6(C) are images showing a liquid crystal display panel for an inspection process, which includes alignment molecules disposed on an inorganic layer.
Figure 6B:
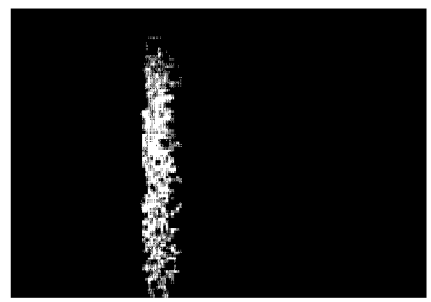
Figure 6C:
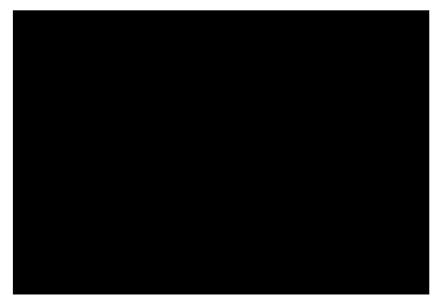

FIGS. 6(A), 6(B), 6(C), 7(A), and 7(B) show the images in a normally black state. A first image shown in FIG. 6(A) represents the total image of the liquid crystal display panel according to an exemplary embodiment of the present invention a second image shown in FIG. 6(B) represents an enlarged image of the area in which the sealant is disposed, and a third image shown in FIG. 6(C) represents the image of center portion of the liquid crystal display panel for the inspection process. FIGS. 6(A)-6(C) show the images of the liquid crystal display panel for the inspection process, which include liquid crystal molecules aligned in the same condition as the liquid crystal display panel described with reference to FIGS. 1 to 5. As shown in FIGS. 6(A)-6(C), the liquid crystal molecules LM are uniformly and vertically aligned, and thus, light leakage does not occur.

Figure 7A:
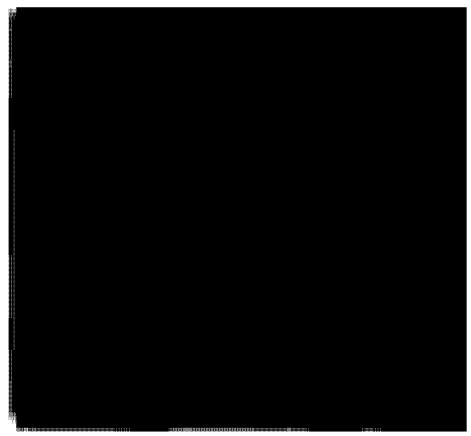
FIGS. 7(A) and 7(B) are images showing a liquid crystal display panel for an inspection process, which includes alignment molecules disposed on an organic layer.
Figure 7B:
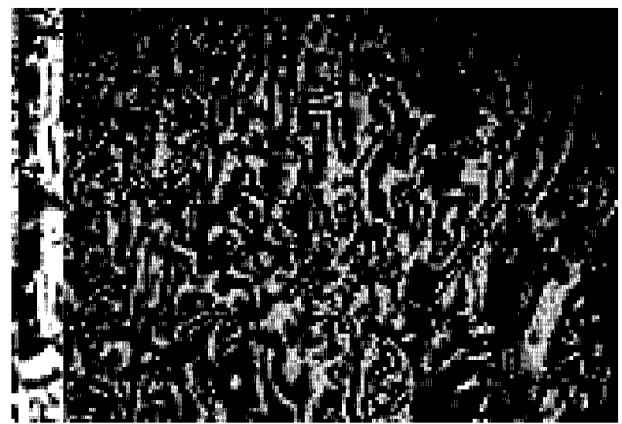

In FIG. 7(A), a first image shows the total image of the liquid crystal display panel including the liquid crystal layer aligned on the organic layer, and a second image shown in FIG. 7(B) shows the image of the center portion of the liquid crystal display panel. As shown in FIGS. 7(A) and 7(B), because the liquid crystal molecules LM are horizontally aligned, stained images appear. This is because of the reduced interaction between the organic layer and the alignment molecules LAM and the mixing of the alignment molecules LAM with the liquid crystal molecules LM.

Figure 8A:
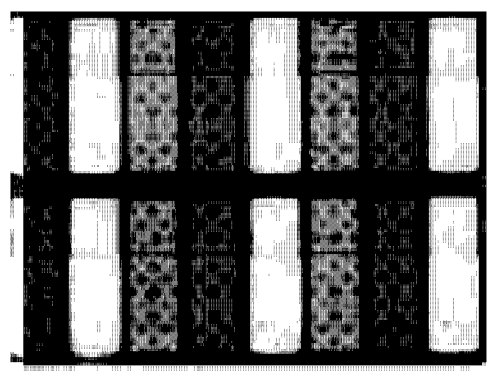
FIGS. 8(A) and 8(B) are images showing a liquid crystal display panel according to an exemplary embodiment of the present invention, and a conventional liquid crystal display panel including alignment molecules disposed on an organic layer.
Figure 8B:
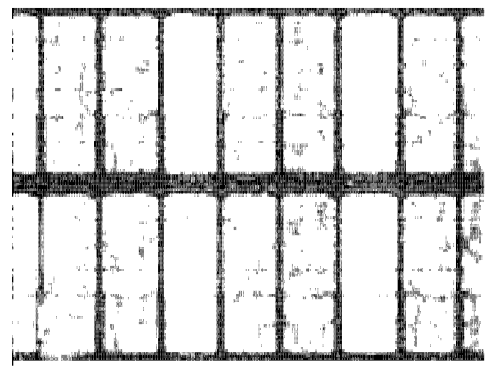

In FIG. 8(A), a first image shows an activated state of the liquid crystal display panel according to an exemplary embodiment of the present invention, and a second image shown in FIG. 8(B) shows an activated state of the liquid crystal display panel including the liquid crystal layer aligned on the organic layer. The first image shows a uniform light transmittance, and the second image shows a non-uniform light transmittance.

Although the liquid crystal display panel according to the present exemplary embodiment does not include the organic alignment layer such as polyimide, the liquid crystal molecules LM may be vertically aligned by the interaction between the alignment molecules LAM and the first and second inorganic layers NOL1 and NOL2. The liquid crystal display panel, not including the organic alignment layer, may have several benefits, e.g., a simplified manufacturing process, a low manufacturing cost, etc. In addition, stains, afterimages, and alignment defects, which may be caused by irregular formation of the organic alignment layer, may be prevented.

Figure 9:
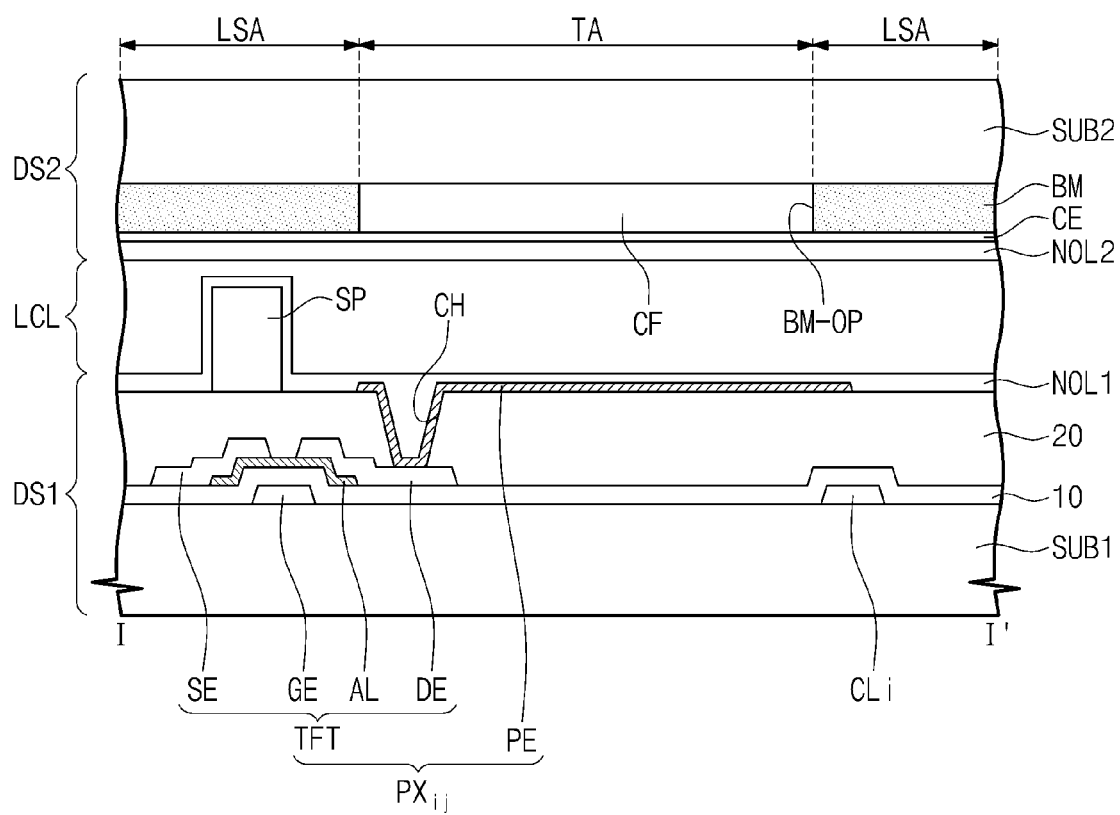
FIG. 9 is a cross-sectional view showing a pixel according to an exemplary embodiment of the present invention.
Figure 10A:
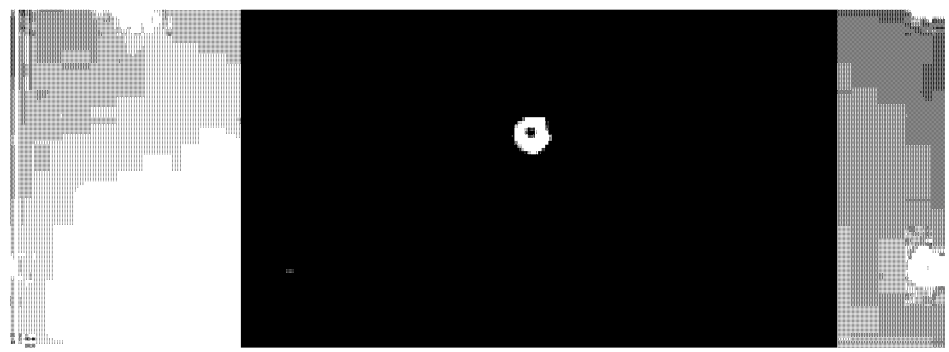
FIGS. 10(A) and 10(B) are images showing a liquid crystal display panel including a spacer.
Figure 10B:
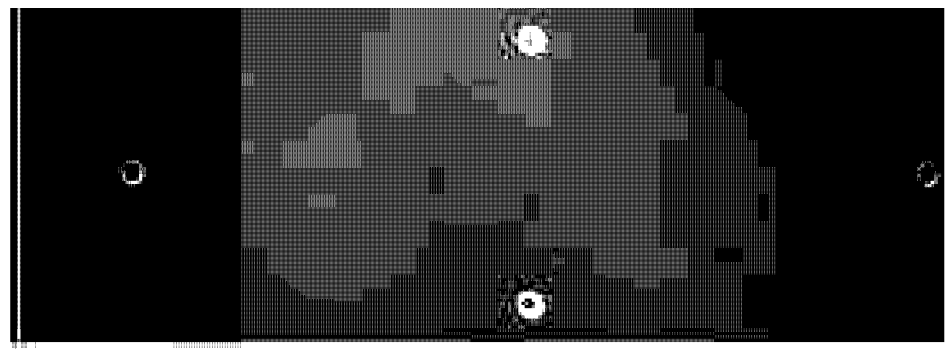

In FIGS. 9, 10(A), and 10(B), the same reference numerals denote the same elements in FIGS. 1 to 8(B), and thus, detailed descriptions of the same elements will be omitted.

Referring to FIG. 9, the liquid crystal display panel further includes the spacer SP. The spacer SP maintains a cell gap between the first display substrate DS1 and the second display substrate DS2. The spacer SP is disposed on at least one of the first display substrate DS1 and the second display substrate DS2. In FIG. 9, the spacer SP is disposed on the first display substrate DS1, but it should not be limited thereto.

The spacer SP is disposed on the planarization layer 20. The spacer SP is covered by the first inorganic layer NOL1. The spacer SP may include the organic material. The first inorganic layer NOL1 prevents interaction between the spacer SP and the liquid crystal layer LCL. Accordingly, the arrangement of the liquid crystal layer LCL may be uniformly maintained regardless of the spacer SP.

The spacer SP may be disposed to correspond to some of the pixels PX11 to PXnm (refer to FIG. 1). The spacer SP may be disposed to overlap with the thin film transistor TFT of the corresponding pixel. Because the spacer SP and the thin film transistor TFT are overlapped with the light blocking area LSA, an aperture ratio of the corresponding pixel may be enhanced.

In FIG. 10(A), a first image shows the liquid crystal display panel including the spacer SP exposed to the liquid crystal layer LCL, and a second image shown in FIG. 10(B) shows the liquid crystal display panel including the spacer SP covered by the first inorganic layer NOL1. As shown in FIGS. 10(A) and 10(B), the liquid crystal display panel of the present invention may reduce the light leakage when compared with that of the conventional liquid crystal display panel. This is because the arrangement of the liquid crystal layer LCL is uniformly maintained regardless of the spacer SP.

Figure 11:
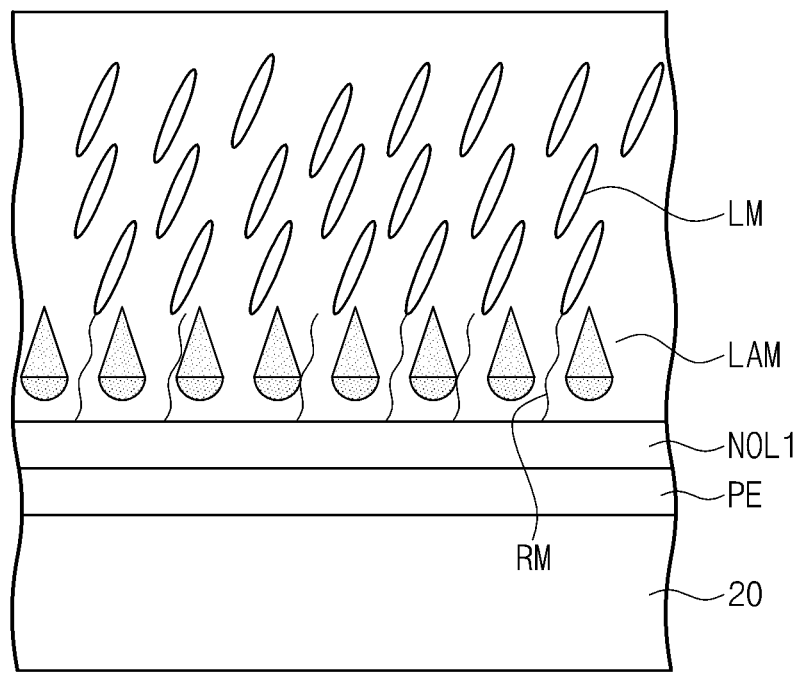
FIG. 11 is an enlarged view showing alignment molecules and liquid crystal molecules disposed on a first inorganic layer of a liquid crystal display according to an exemplary embodiment of the present invention.

FIG. 11 is an enlarged view showing alignment molecules and liquid crystal molecules disposed on a first inorganic layer of a liquid crystal display according to an exemplary embodiment of the present invention. In FIG. 11, the same reference numerals denote the same elements in FIGS. 1 to 10(B), and thus, detailed descriptions of the same elements will be omitted. In FIG. 11, only the arrangement of the liquid crystal layer LCL with respect to the first inorganic layer NOL1 is shown, but the arrangement of the liquid crystal layer LCL with respect to the second inorganic layer NOL2 is the same.

Referring to FIG. 11, the liquid crystal display panel according to the present exemplary embodiment further includes a reactive mesogen. The term of "mesogen" used herein means a photo-cross-linkable low molecular weight or a high molecular weight copolymer including a mesogen group of a liquid crystal property. Examples of suitable reactive mesogens are those including acrylate, methacrylate, epoxy, oxethane, vinyl-ether, styrene, or thiolene groups. In addition, the reactive mesogen may be a material having a bar shape, a banana shape, a board shape, or a disc shape.

The reactive mesogen may have a weight ratio of about 0.001 wt % to about 5.0 wt % with respect to the liquid crystal layer LCL. The reactive mesogen reacts with hydroxyl group of silicon oxide for the first inorganic layer NOL1 or amino group of silicon nitride for the first inorganic layer NOL1, and is bonded with the first inorganic layer NOL1. In addition, the reactive mesogen may be bonded to the first inorganic layer NOL1 by electrostatic attraction.

The liquid crystal molecules LM are inclined by the reactive mesogen. In other words, the liquid crystal molecules LM are pretilted by the reactive mesogen. The pretilted liquid crystal molecules LM become more rapidly inclined at a high angle when the electric field is formed in the pixel PXij. Thus, a response time of the liquid crystal display panel may be improved.

The method of manufacturing the liquid crystal display panel will now be described in detail with reference to FIGS. 12 to 14.

The first display substrate DS1 is manufactured (S10) and then the second display substrate DS2 is manufactured (S20). The manufacturing order of the first and second display substrates DS1 and DS2 should not be limited thereto. The first and second display substrates DS1 and DS2 may be substantially simultaneously manufactured.

Hereinafter, the manufacturing process of the first display substrate DS1 will be omitted. The common line CLi, the gate line GLi, and the gate electrode GE connected to the gate line GLi are formed on the first base substrate SUB1. To this end, a conductive layer (not shown) is formed by a sputtering method, and a photolithography process and an etching process are performed on the conductive layer.

The gate insulating layer 10 is then formed on the first base substrate SUB1 to cover the common line CLi (refer to FIGS. 3 and 4), the gate line GLi (refer to FIGS. 3 and 4), and the gate electrode GE (refer to FIGS. 3 and 4). The gate insulating layer 10 includes silicon nitride or silicon oxide. The gate insulating layer 10 may be formed by a plasma-enhanced chemical vapor deposition (PECVD) method.

The semiconductor layer AL (refer to FIGS. 3 and 4) is formed on the gate insulating layer 10. The semiconductor layer AL is formed by forming a silicon layer using the PECVD method, and patterning the silicon layer using a photolithography process and an etching process.

A conductive layer (not shown) is then formed using a sputtering method, and the conductive layer is patterned by a photolithography process and an etching process. Accordingly, the data line DLj (refer to FIGS. 3 and 4), the source electrode SE (refer to FIGS. 3 and 4), and the drain electrode DE (refer to FIGS. 3 and 4) are formed from the conductive layer.

The planarization layer 20 (refer to FIGS. 3 and 4) and the pixel electrode PE (refer to FIGS. 3 and 4) are then formed on the first base substrate SUB1. The planarization layer 20 is formed using a PECVD coating method, and then the contact hole CH is formed through the planarization layer 20 to expose the drain electrode DE. A transparent conductive layer is formed and patterned by a photolithography process and an etching process, and thus, the pixel electrode PE connected to the drain electrode DE through the contact hole CH is formed.

The first inorganic layer NOL1 is formed on the planarization layer 20 to cover the pixel electrode PE. The first inorganic layer NOL1 may be formed using a PECVD sputtering method.

According to another exemplary embodiment, the spacer SP (refer to FIG. 9) may be further formed on the planarization layer 20 before the first inorganic layer NOL1 is formed. The spacer SP (refer to FIG. 9) may be formed by forming and patterning the organic layer, or by using an inkjet printing method.

Hereinafter, the manufacturing process of the second display substrate DS2 will be described. The black matrix BM is formed on the second base substrate SUB2. The black matrix BM is formed by coating a black organic layer and patterning the black organic layer, and thus, the opening BM-OP is formed through the black matrix BM. Then, the color filter CF is formed to overlap with the opening BM-OP. The color filter CF is formed by coating a colored organic material to correspond to the opening BM-OP. The common electrode CE is formed on the color filter CF. The first inorganic layer NOL1 of the first display substrate DS1 and the second inorganic layer NOL2 of the second display substrate DS2 are then surface-treated (S30).

According to the present exemplary embodiment, the surface-treating of the first and second inorganic layers NOL1 and NOL2 includes a heat treatment process of heat-treating the first and second inorganic layers NOL1 and NOl2 at a temperature of about 80 Celsius degrees to about 120 Celsius degrees during a time of about 0.5 hours to about 2 hours. As a result of the heat treatment process, moisture existing on the first and second inorganic layers NOL1 and NOL2 is evaporated. The heat-treating performed on the above-mentioned condition does not damage the organic layer of the first and second display substrates DS1 and DS2.

Figure 13A:
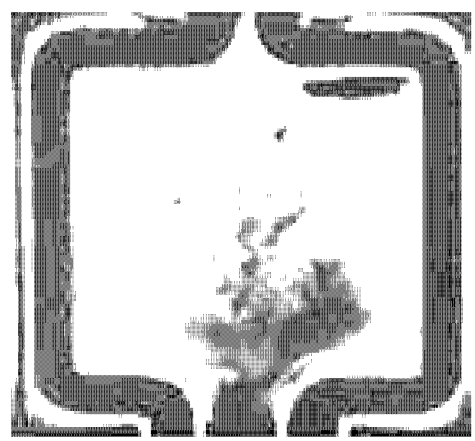
FIGS. 13(A) and 13(B) are images showing a liquid crystal display panel on which a surface treatment is performed according to an exemplary embodiment of the present invention.
Figure 13B:
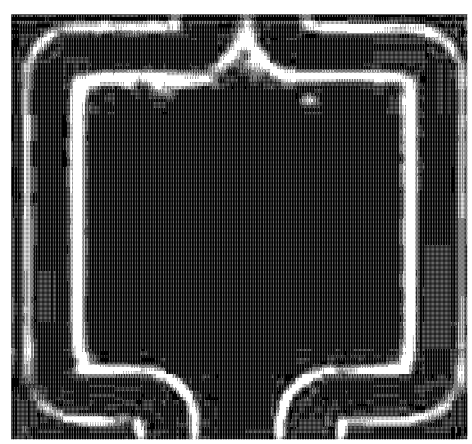

In FIG. 13(A), a first image shows the liquid crystal display panel on which the heat treatment process is not performed, and a second image shown in FIG. 13(B) shows the liquid crystal display panel on which the heat treatment process is performed. As shown in FIGS. 13(A) and 13(B), the arrangement of the liquid crystal layer LCL of the liquid crystal display panel from which the moisture is evaporated by the heat treatment process is uniform.

According to the present exemplary embodiment, the heat treatment process includes an irradiation process to irradiate an ultraviolet ray onto the first and second inorganic layers NOL1 and NOL2. The first and second inorganic layers NOL1 and NOL2 are surface-treated for several minutes by ultraviolet radiation of about 1 mW/cm$^2$ to about 500 mW/cm$^2$.

Figure 14:
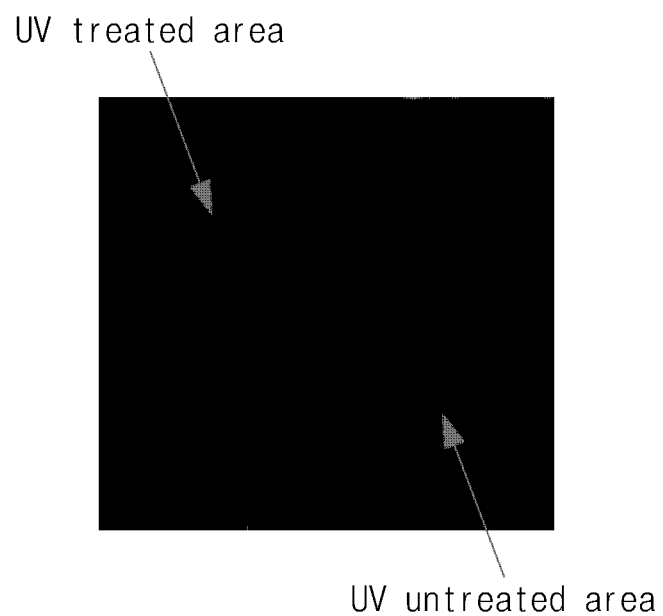
FIG. 14 is an image showing a liquid crystal display panel on which a surface treatment is performed according to an exemplary embodiment of the present invention.

FIG. 14 shows the image of the liquid crystal display panel on which the surface treatment is performed, and the image of the liquid crystal display panel on which the surface treatment is not performed. The liquid crystal molecules are uniformly aligned in the portion on which the UV-treatment is performed, but the liquid crystal molecules are non-uniformly aligned in the portion on which the UV-treatment is not performed. As a result, light leakage does not occur in the portion on which the UV-treatment is performed, and the stains appear in the portion on which the UV-treatment is not performed.

According to the present exemplary embodiment, the surface treatment process includes an oxygen-plasma treatment process performed on the first and second inorganic layers NOL1 and NOL2. As a result of the oxygen-plasma treatment process, an oxygen density of the first and second inorganic layers NOL1 and NOL2 is enhanced. The enhanced oxygen increases the hydrogen-bonding force between the first and second inorganic layers NOL1 and NOL2 and the alignment molecules LAM. Accordingly, the alignment molecules LAM uniformly form the alignment molecule layer on the first and second inorganic layers NOL1 and NOL2.

The first display substrate DS1 is then coupled to the second display substrate (S40). In detail, the sealant SM (refer to FIG. 2) is disposed between the non-display area NDA (refer to FIG. 2) of the first display substrate DS1 and the non-display area NDA (refer to FIG. 2) of the second display substrate DS2, and then the first and second display substrates DS1 and DS2 are coupled to each other.

According to another exemplary embodiment, after the first display substrate DS1 is coupled to the second display substrate DS2, the surface treatment process, e.g., the heat-treatment process, may be performed on a portion of the first and second display substrates DS1 and DS2.

After that, the liquid crystal layer LCL is formed between the first display substrate DS1 and the second display substrate DS2 (S50). The liquid crystal mixture containing the alignment molecules LAM and the liquid crystal molecules LM is injected between the first display substrate DS1 and the second display substrate DS2. The liquid crystal mixture may be injected at a temperature of about 40° C. to about 70° C., which is higher than room temperature.

When the liquid crystal mixture is injected, the alignment molecules LAM interact with the first and second inorganic layers NOL1 and NOL2. The alignment molecules LAM are vertically aligned with respect to the first and second inorganic layers NOL1 and NOL2. The alignment molecule layer is formed on the first inorganic layer NOL1 and on the second inorganic layer NOL2. The liquid crystal molecules LM are vertically aligned between the alignment molecule layer formed on the first inorganic layer NOL1 and the alignment molecule layer formed on the second inorganic layer NOL2.

In the present exemplary embodiment, the liquid crystal mixture may further include the reactive mesogen (refer to FIG. 11). When the liquid crystal mixture further including the reactive mesogen is injected, an additional process is performed to couple the reactive mesogen to the first and second inorganic layers NOL1 and NOL2.

When the liquid crystal molecules LM are vertically aligned between the first and second inorganic layers NOL1 and NOL2, an electric field is formed between the pixel electrode PE (refer to FIG. 4) and the common electrode CE (refer to FIG. 4). An intensity of this electric field may be smaller than that of the electric field required to generate the image.

When the electric field is generated between the pixel electrode PE (refer to FIG. 4) and the common electrode CE (refer to FIG. 4), the liquid crystal molecules LM are inclined with respect to the first and second inorganic layers NOL1 and NOL2.

The light is radiated to the liquid crystal layer LCL (refer to FIG. 4) in the same direction as the direction to which the liquid crystal molecules LM are inclined. The reactive mesogen is inclined with respect to the first and second inorganic layers NOL1 and NOL2 as the liquid crystal molecules LM. The reactive mesogen is cured in substantially the same direction as the liquid crystal molecules LM. The reactive mesogen is physically or chemically coupled to the first and second inorganic layers NOL1 and NOL2 while being cured. Therefore, although the electric field is removed, the liquid crystal molecules LM are aligned inclined to the first and second inorganic layers NOL1 and NOL2.

Figure 15:
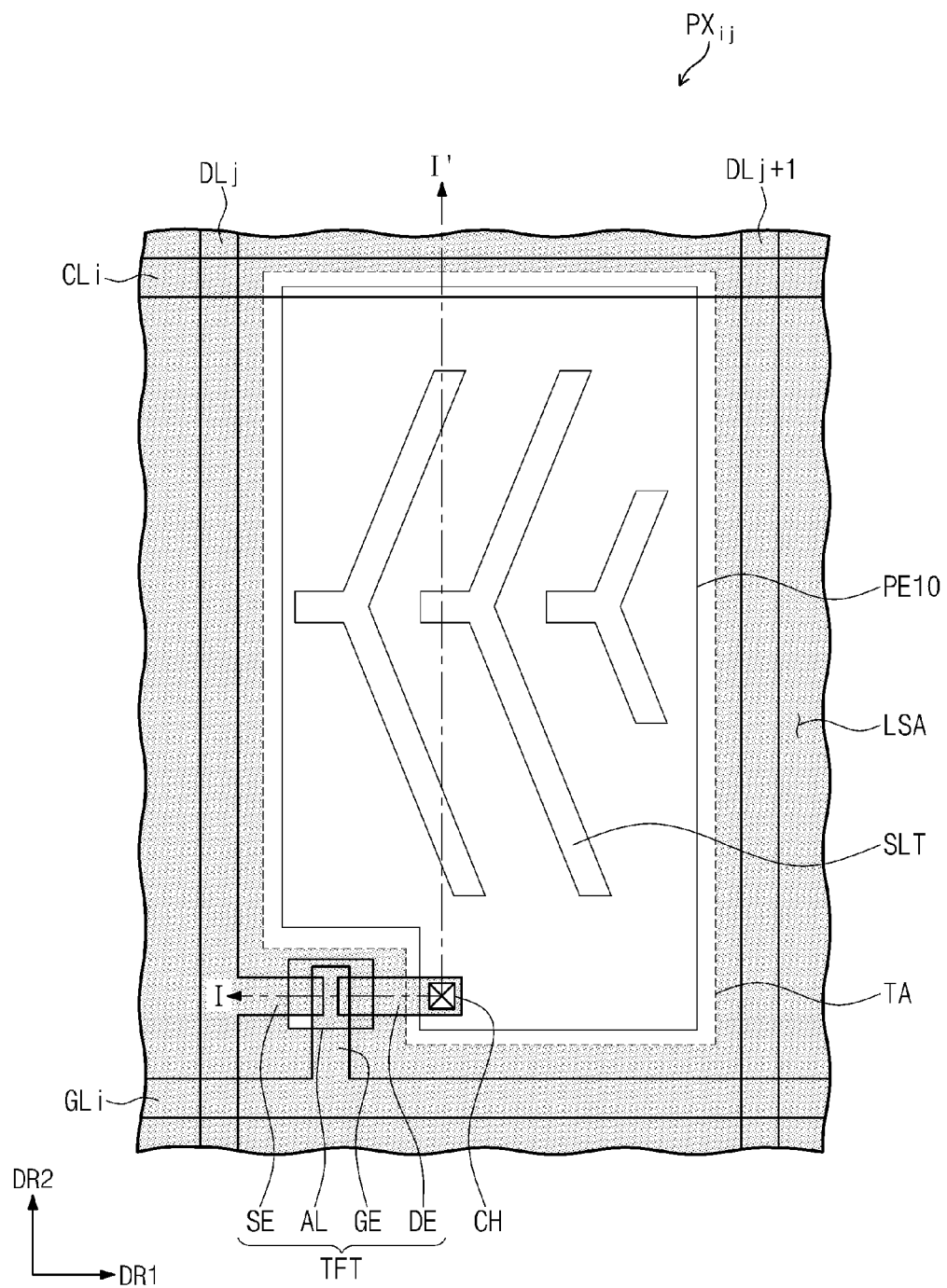
FIG. 15 is a plan view showing a pixel according to an exemplary embodiment of the present invention.
Figure 16:
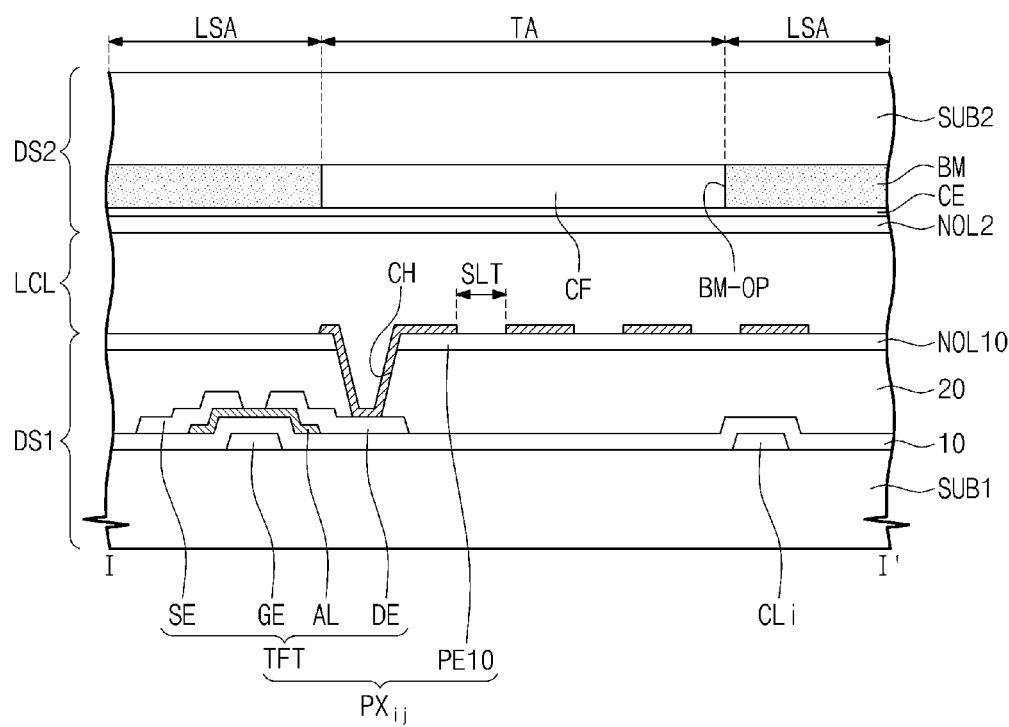
FIG. 16 is a plan view showing a pixel according to an exemplary embodiment of the present invention.

Referring to FIGS. 15 and 16, a first inorganic layer NOL10 is disposed on the planarization layer 20. The first inorganic layer NOL10 covers the planarization layer 20 such that the planarization layer 20 containing the organic material does not make contact with the alignment molecules LAM and the liquid crystal molecules LM. The pixel electrode PE10 is disposed on the first inorganic layer NOL10.

The pixel electrode PE10 includes at least one slit SLT. As shown in FIG. 15, the slit SLT may have a V shape rotated clockwise by about 90 degrees. The slit SLT divides the pixel PXij into several domains to improve a viewing angle of the liquid crystal display panel.

The color filter CE is disposed on the black matrix BM and the color filter CF. Although not shown in figures, the common electrode CE may include at least one slit. The second inorganic layer NOL2 is disposed on the common electrode CE.

The alignment molecules LAM and the liquid crystal molecules LM are vertically aligned between the first inorganic layer NOL10 and the second inorganic layer NOL2. The alignment molecules LAM, which are vertically aligned adjacent to the first inorganic layer NOL10 and the second inorganic layer NOL2, guide the liquid crystal molecules LM.

When the common electrode CE includes a transparent conductive inorganic material, the second inorganic layer NOL2 may be omitted. The transparent conductive inorganic material has the same function as the second inorganic layer NOL2 against the alignment molecules LAM. Therefore, the alignment molecules LAM are vertically aligned adjacent to the common electrode CE including the transparent conductive inorganic material.

Figure 17:
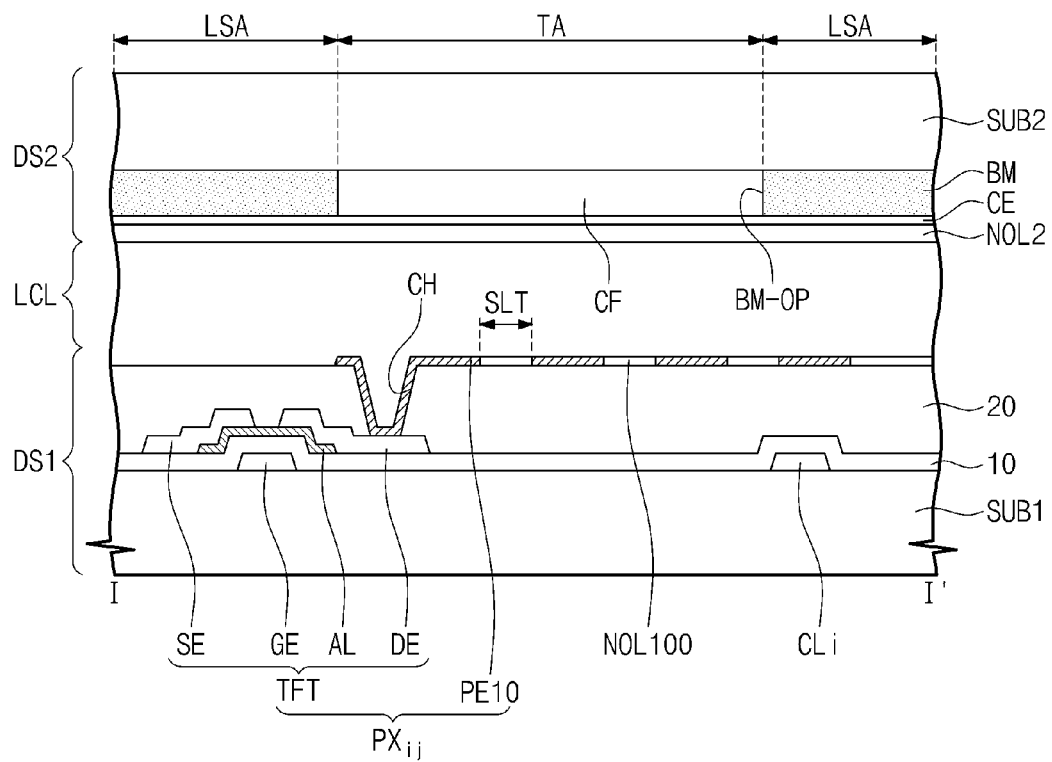
FIG. 17 is a plan view showing a pixel according to an exemplary embodiment of the present invention.

Referring to FIG. 17, a pixel electrode PE10 and a first inorganic layer NOL100 are disposed on the planarization layer 20. The pixel electrode PE10 includes at least one slit SLT.

The first inorganic layer NOL100 is disposed to correspond to the slit SLT. In other words, the first inorganic layer NOL100 is inserted into the slit SLT. The first inorganic layer NOL100 has a shape corresponding to the slit SLT when viewed in a plan view.

In this case, the pixel electrode PE10 includes a transparent conductive inorganic material. Consequently, one inorganic layer configured by the first inorganic layer NOL100 and the pixel electrode PE10 is formed on the planarization layer 20 including the organic material. The one inorganic layer covers the planarization layer 20 to prevent the planarization layer 20 from making contact with the alignment molecules LAM and the liquid crystal molecules LM.

The common electrode CE is disposed on the black matrix BM and the color filter CF. Although not shown in figures, the common electrode CE may include at least one slit. The second inorganic layer NOL2 is disposed on the common electrode CE. The second inorganic layer NOL2 may be also inserted into the slit of the common electrode CE.

The alignment molecules LAM and the liquid crystal molecules LM are vertically aligned between the one inorganic layer configured by the first inorganic layer NOL100 and the pixel electrode PE10 and the second inorganic layer NOL2.

According to the above, the liquid crystal display panel does not include an organic alignment layer. Although the liquid crystal display panel does not include the organic alignment layer, such as polyimide, the liquid crystal molecules may be vertically aligned as a result of the interaction between the alignment molecules and the first and second inorganic layers. Thus, a manufacturing process of the liquid crystal display panel is simplified and a manufacturing cost of the liquid crystal display panel is reduced. In addition, light leakage caused by the organic alignment layer may be prevented.

The manufacturing method of the liquid crystal display panel includes surface-treating the first and second display substrates. When the first and second inorganic layers are surface-treated, the vertical alignment property of the liquid crystal molecules may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel comprising:
a first display substrate comprising:
   a first base substrate;
   pixel electrodes disposed on the first base substrate; and
   a first inorganic layer covering the pixel electrodes and comprising an inorganic silicon-based material;
a second display substrate comprising:
   a second base substrate spaced apart from the first base substrate;
   a common electrode disposed on the second base substrate; and
   a second inorganic layer disposed on the common electrode and comprising the inorganic silicon-based material; and
a liquid crystal layer comprising:
   alignment molecules vertically aligned with respect to the first inorganic layer and the second inorganic layer; and
   liquid crystal molecules vertically aligned between the first inorganic layer and the second inorganic layer,
wherein the alignment molecules comprise:
a core portion;
a polarity portion connected to a first end of the core portion; and
a tail portion connected to an opposing second end of the core portion.

2. The liquid crystal display panel of claim 1, wherein the inorganic silicon-based material comprises at least one of silicon oxide and silicon nitride.

3. The liquid crystal display panel of claim 1, wherein each of the first and second inorganic layers has a thickness of about 1 nm to about 1000 nm.

4. The liquid crystal display panel of claim 1, wherein the first display substrate further comprises:
signal lines; and
thin film transistors, each of which is connected to a corresponding one of the signal lines and a corresponding one of the pixel electrodes.

5. The liquid crystal display panel of claim 4, wherein at least one of the first display substrate and second display substrate further comprises spacers configured to maintain a cell gap between the first display substrate and the second display substrate.

6. The liquid crystal display panel of claim 5, wherein the spacers are disposed on the first base substrate, and the first inorganic layer covers the spacers.

7. The liquid crystal display panel of claim 5, wherein each of the spacers overlaps with a corresponding one of the thin film transistors.

8. The liquid crystal display panel of claim 1, wherein each of the first display substrate and the second display substrate further comprises a reactive mesogen bonded to the first inorganic layer and second inorganic layer.

9. The liquid crystal display panel of claim 1, wherein:
the core portion comprises biphenyl, benzene, or cyclohexane;
the polarity portion comprises a hydroxyl group or an amino group; and
the tail portion comprises alkyl groups connected to each other one after another.

* * * * *